United States Patent
Nakadai et al.

(10) Patent No.: US 8,391,505 B2
(45) Date of Patent: Mar. 5, 2013

(54) REVERBERATION SUPPRESSING APPARATUS AND REVERBERATION SUPPRESSING METHOD

(75) Inventors: Kazuhiro Nakadai, Wako (JP); Hirofumi Nakajima, Wako (JP); Hiroshi Okuno, Kyoto (JP); Ryu Takeda, Kyoto (JP)

(73) Assignee: Honda Motor Co., Ltd., Tokyo (JP)

( * ) Notice: Subject to any disclaimer, the term of this patent is extended or adjusted under 35 U.S.C. 154(b) by 465 days.

(21) Appl. No.: 12/791,428

(22) Filed: Jun. 1, 2010

(65) Prior Publication Data

US 2010/0329472 A1     Dec. 30, 2010

Related U.S. Application Data

(60) Provisional application No. 61/217,760, filed on Jun. 4, 2009.

(51) Int. Cl.
   *H04B 3/20* (2006.01)
(52) U.S. Cl. .......................................... 381/66; 381/94.1
(58) Field of Classification Search .................... 381/66, 381/56, 57, 58, 92, 96, 98, 387, 94.1–94.5; 704/275, 226, 258, 259; 379/406.01, 406.08, 379/406.14, 207.01, 67; 84/477 R, 611; 700/94

See application file for complete search history.

(56) References Cited

U.S. PATENT DOCUMENTS

| 5,694,474 A * | 12/1997 | Ngo et al. ........................ 381/66 |
| 5,761,318 A * | 6/1998 | Shimauchi et al. ............. 381/66 |
| 5,774,562 A * | 6/1998 | Furuya et al. .................... 381/66 |
| 8,041,046 B2 * | 10/2011 | Ohta et al. ....................... 381/66 |
| 2011/0044462 A1 * | 2/2011 | Yoshioka et al. ............... 381/66 |

FOREIGN PATENT DOCUMENTS

| JP | 9-261133 | 10/1997 |
| JP | 2008-306712 | 12/2008 |

OTHER PUBLICATIONS

Miyabe, Shigeki et al., "Barge-in- and Noise-free Spoken Dialogue Interface Based on Sound Field Control and Semi-blind Source Separation," 15th European Signal Processing Conference (EUSIPCO 2007), pp. 232-236 (2007).
Takeda, Ryu et al., "ICA-based Efficient Blind Dereverberation and Echo Cancellation Method for Barge-in-able Robot Audition," ICASSP, pp. 3677-3680 (2009).

* cited by examiner

*Primary Examiner* — Xu Mei
*Assistant Examiner* — Lao Lun-See
(74) *Attorney, Agent, or Firm* — Nelson Mullins Riley & Scarborough LLP; Anthony A. Laurentano

(57) ABSTRACT

A reverberation suppressing apparatus separating sound source signals based on input signals output from microphones collecting the plurality of sound source signals, includes a sound signal output unit generating sound signals and outputting the generated sound signals, a sound acquiring unit acquiring the input signals from microphones, a first evaluation function calculation unit calculating a separation matrix, the input signals, and the sound source signals, and calculating a first evaluation function, a reverberation component suppressing unit calculating an optimal separation matrix, and suppressing a reverberation component by separating the sound source signals other than the generated sound signals, and a separation matrix updating unit dividing a step-size function, approximating each segment to a linear function, calculating step sizes based on the approximated linear functions, and repeatedly updating the separation matrix so that the degree of separation of the sound source signals exceeds the predetermined value.

8 Claims, 11 Drawing Sheets

FIG. 5A    FIG. 5B
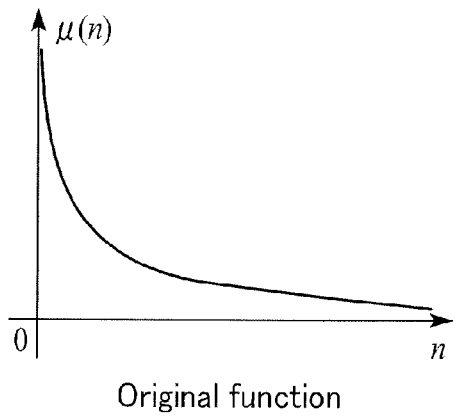
Original function
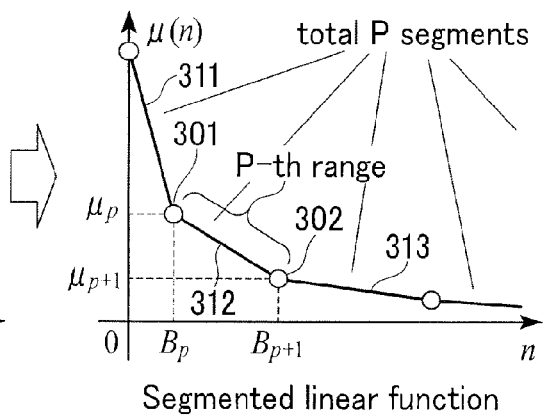
Segmented linear function
FIG. 6
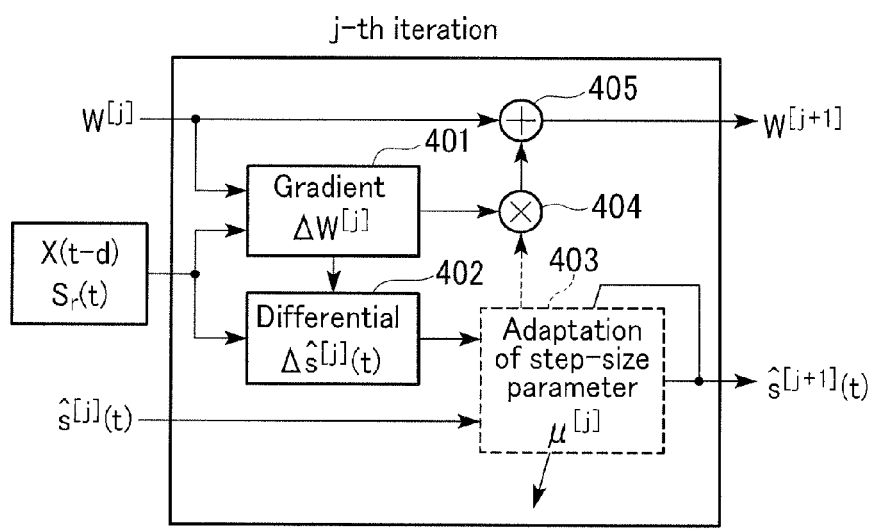

FIG. 9

| Impulse response | |
|---|---|
| Reverberation time (RT$_{20}$) | |
| Distance and direction | 1.5m and 0°, 45°, 90°, -45°, -90° |
| Number of microphones | Two (embedded in Robot's head) |
| | Hanning: 64ms and shift: 24ms |
| Input wave data | [-1.0 1.0] normalized |

FIG. 10

| Test set | 200 sentences |
|---|---|
| Training set | 200 people (150 sentences each) |
| Acoustic model | PTM-triphone: 3-state, HMM |
| Language model | Statistical, vocabulary size 20k |
| Speech analysis | Hanning: 32ms and shift: 10ms |
| Features | MFCC 25 dim. (12+Δ12+ΔPow) |

FIG. 11

| TEST CONDITION | DESCRIPTION |
|---|---|
| 1 | USE OF METHOD ACCORDING TO EMBODIMENT, NUMBER OF SEGMENTS P=1 |
| 2 | USE OF METHOD ACCORDING TO EMBODIMENT, NUMBER OF SEGMENTS P=2 |
| 3 | USE OF METHOD ACCORDING TO EMBODIMENT, NUMBER OF SEGMENTS P=0 |
| 4 | STEP SIZE CALCULATED IN ANNEALING BASE, $\lambda$=0.9 |
| 5 | FIXED STEP SIZE OF $\mu$=0.05 |
| 6 | FIXED STEP SIZE OF $\mu$=0.1 |

FIG. 16

PROCESSING TIME RATIO (PTR)

| Configuration | PTR | inverse PTR |
|---|---|---|
| Exp.A,N=9 | 1.983 | 0.504 |
| Exp.A,N=23 | 1.564 | 0.609 |
| Exp.B,N=9 | 1.727 | 0.579 |
| Exp.B,N=23 | 1.406 | 0.711 |

REVERBERATION SUPPRESSING APPARATUS AND REVERBERATION SUPPRESSING METHOD

CROSS REFERENCE TO RELATED APPLICATIONS

This application claims benefit from U.S. Provisional application Ser. No. 61/217,760, filed Jun. 4, 2009, the contents of which are incorporated herein by reference.

BACKGROUND OF THE INVENTION

1. Field of the Invention

The present invention relates to a reverberation suppressing apparatus and a reverberation suppressing method.

2. Description of the Related Art

A reverberation suppressing process is an important technology used as a pre-process of auto-speech recognition, aiming at improvement of articulation in a teleconference call or a hearing aid and improvement of a recognition rate of auto-speech recognition used for speech recognition in a robot (robot hearing sense). In the reverberation suppressing process, reverberation is suppressed by calculating a reverberation component from an acquired sound signal every predetermined frames and by removing the calculated reverberation component from the acquired sound signal (see, for example, Unexamined Japanese Patent Application, First Publication No. H09-261133 (Patent Document 1)).

As a reverberation suppressing technology using an independent component analysis (ICA), a technology of updating a filter with a step size fixed has been suggested (for example, Ryu Takeda, Kazuhiro Nakadai, Kaznori Komatani, Tetsuya Ogata, and Hiroshi Okano, "Evaluation of Barge-in allowability using MFT and ICA for Conversation with Robot", Information Processing Society, 70-th National Convention of Information Processing Society, 2008, p2-135 (Non-patent Document 1)). In addition, a technology of updating a filter by adaptively changing a step size has been suggested as the reverberation suppressing technology using an independent component analysis (see, for example, Unexamined Japanese Patent Application, First Publication No. 2008-306712 (Patent Document 2)).

SUMMARY OF THE INVENTION

However, in the known technology described in Non-patent Document 1, because a separation filter is updated with a step size fixed at every frame, problems are encountered in that the process of suppressing a reverberation sound component takes a long time when the step size becomes smaller, and the process of suppressing a reverberation component cannot be performed with a high accuracy when the step size is not adequate. In the known technology described in Patent Document 2, since the nonlinearity of an evaluation function is high in a multi-channel semi-blind independent component analysis, the order of a separation filter used in the independent component analysis becomes higher, the calculation takes time, and the calculation cost increases, which is not practical.

To solve the above-mentioned problems, it is therefore an object of the invention to provide a reverberation suppressing apparatus and a reverberation suppressing method which can reduce the number of calculation processes and reduce a reverberation component with a high accuracy.

According to an aspect of the invention, there is provided a reverberation suppressing apparatus separating a plurality of sound source signals based on input signals output from a plurality of microphones collecting the plurality of sound source signals, including: a sound signal output unit generating sound signals and outputting the generated sound signals; a sound acquiring unit acquiring the input signals from the microphones; a first evaluation function calculation unit calculating a separation matrix representing correlations among the generated sound signals, the input signals, and the sound source signals, and calculating a first evaluation function for evaluating a degree of separation of the sound source signals from the input signals; a reverberation component suppressing unit calculating, based on the first evaluation function, an optimal separation matrix which is the separation matrix when the degree of separation of the sound source signals is greater than a predetermined value, and suppressing a reverberation component by separating the sound source signals other than the generated sound signals from the input signal based on the calculated optimal separation matrix; and a separation matrix updating unit dividing a step-size function for determining a magnitude of updating of the separation matrix into segments, approximating each of the segments to a linear function, calculating step sizes based on the approximated linear functions, and repeatedly updating the separation matrix by using the calculated step sizes so that the degree of separation of the sound source signals exceeds the predetermined value based on the first evaluation function.

In the reverberation suppressing apparatus, the separation matrix updating unit may calculate the step size for each of the segments by using the step sizes at both ends of each of the segments approximated to the linear function, and calculates the step sizes so that a second evaluation function for evaluating the step sizes is minimized. In the reverberation suppressing apparatus, the separation matrix updating unit may approximate each of the segments to the linear function so that the step sizes at both ends of each of the segments approximated to the linear functions are continuous to that of the next segments.

The reverberation suppressing apparatus may further include a whitening unit whitening the input signals and the generated sound signals by performing a spherization process and a variance normalizing process, and the first evaluation function calculation unit may calculate the separation matrix based on the whitened input signals.

In the reverberation suppressing apparatus, the whitening unit may forcibly remove a temporal correlation from the whitened signals and forcibly removes a correlation between the generated sound signals and the input signals in the whitened signals from the signals obtained by forcibly removing the temporal correlation.

In the reverberation suppressing apparatus, the reverberation component suppressing unit may calculate parameters for calculating a number of the segments by spherization, and calculates the number of the segments by using the calculated parameters.

In the reverberation suppressing apparatus, the reverberation component suppressing unit may suppress a reverberation component by updating the separation matrix and separating the sound source signals from the input signals by using an independent component analysis method.

According to another aspect of the invention, there is provided a reverberation suppressing method in a reverberation suppressing apparatus separating a plurality of sound source signals based on input signals output from a plurality of microphones collecting the plurality of sound source signals, including: a sound signal output step in which a sound signal output unit generates sound signals and outputs the generated sound signals; a sound acquiring step in which a sound acquiring unit acquires the input signals from the microphones; a first evaluation function calculation step in which a first evaluation function calculation unit calculates a separation matrix representing correlations among the generated sound signals, the input signals, and the sound source signals, and calculates a first evaluation function for evaluating a degree of separation of the sound source signals from the input signals; and a reverberation component suppressing step in which a second processing unit calculates, based on the first evaluation function, an optimal separation matrix which is the separation matrix when the degree of separation of the sound source signals is greater than a predetermined value, and suppresses a reverberation component by separating the sound source signals other than the generated sound signals from the input signal based on the calculated optimal separation matrix; and a separation matrix updating step in which a separation matrix updating unit divides a step-size function for determining a magnitude of updating of the separation matrix into segments, approximates each of the segments to a linear function, calculates a step sizes based on the approximated linear functions, and repeatedly updates the separation matrix by using the calculated step sizes so that the degree of separation of the sound source signals exceeds the predetermined value based on the first evaluation function.

According to the above-mentioned configurations, the sound signal output unit generates sound signals and outputs the generated sound signals, the sound acquiring unit acquires the input signals from the microphones, the first evaluation function calculation unit calculates a separation matrix representing correlations among the generated sound signals, the input signals, and the sound source signals, and calculates a first evaluation function for evaluating a degree of separation of the sound source signals from the input signals, the reverberation component suppressing unit calculates, based on the first evaluation function, an optimal separation matrix which is the separation matrix when the degree of separation of the sound source signals is greater than a predetermined value, and suppresses a reverberation component by separating the sound source signals other than the generated sound signals from the input signal based on the calculated optimal separation matrix, and the separation matrix updating unit divides a step-size function for determining a magnitude of updating of the separation matrix into segments, approximates each of the segments to a linear function, calculates step sizes based on the approximated linear functions, and repeatedly updates the separation matrix based on the calculated step sizes so that the degree of separation of the sound source signals exceeds the predetermined value based on the first evaluation function, thereby suppressing the reverberation component; therefore, it is possible to suppress the reverberation component with a high accuracy while reducing the number of calculating processes.

According to the above-mentioned configurations, since the sound signals acquired by the microphones are whitened and the first evaluation function calculation unit calculates the separation matrix using the whitened signals, it is possible to suppress the reverberation component with a higher accuracy while further reducing the number of calculating processes.

According to the above-mentioned configurations, since the parameters for calculating the number of the segments used to calculate the step sizes are calculated by spherization and the number of the segments is calculated using the calculated parameters, it is possible to suppress the reverberation component with a high accuracy while reducing the number of calculating processes.

BRIEF DESCRIPTION OF THE DRAWINGS

FIGS. 5A and 5B are diagrams illustrating update of a step size according to the first embodiment of the invention.

FIG. 6 is a diagram illustrating segmented linear modeling of a step size according to the first embodiment of the invention.

FIG. 9 is a diagram illustrating data and setting conditions of the reverberation suppressing apparatus used in a test according to the first embodiment of the invention.

FIG. 10 is a diagram illustrating setting conditions of speech recognition according to the first embodiment of the invention.

FIG. 11 is a diagram illustrating test conditions according to the first embodiment of the invention.

FIG. 16 is a diagram illustrating PTR results of Test A and Test B according to the first embodiment of the invention.

DETAILED DESCRIPTION OF THE INVENTION

Hereinafter, exemplary embodiments of the invention will be described in detail with reference to FIGS. 1 to 16. However, the invention is not limited to the embodiments, but may be modified in various forms without departing from the technical spirit thereof.

First Embodiment

Figure 1:
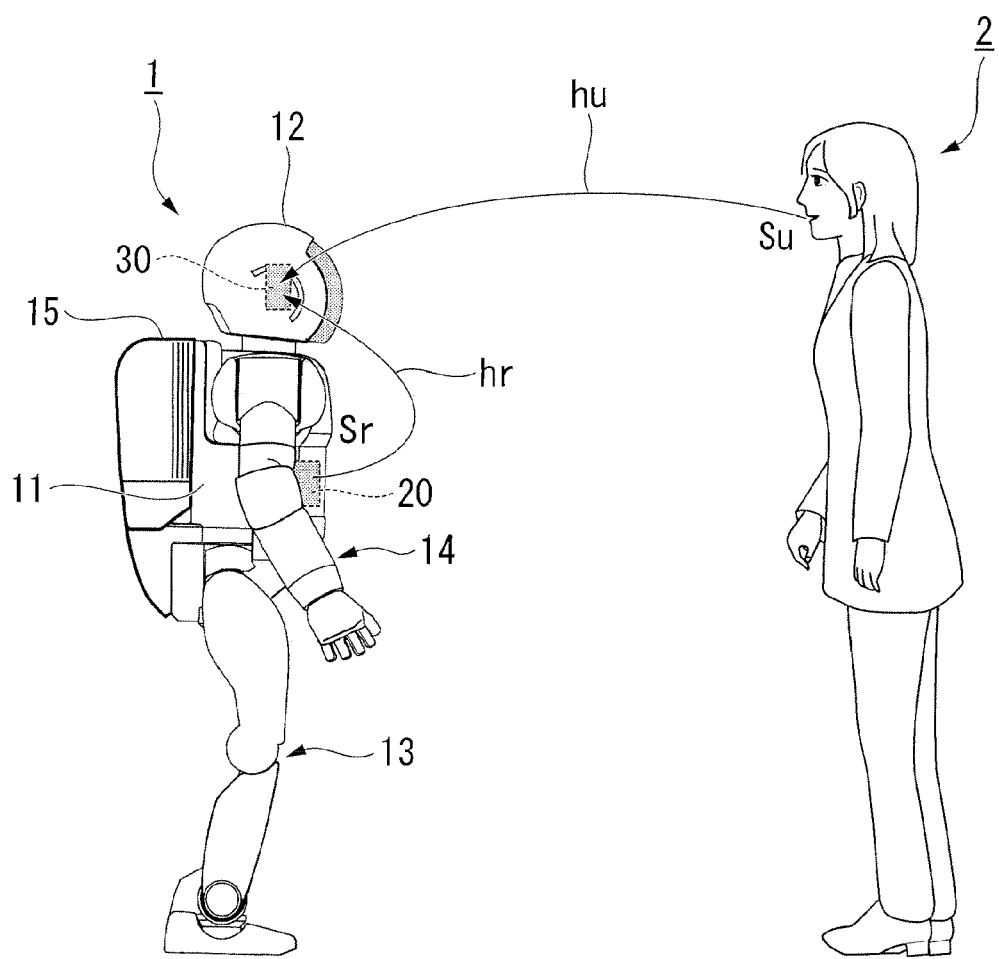
FIG. 1 is a diagram illustrating an example where a sound signal is acquired by a robot mounted with a reverberation suppressing apparatus according to a first embodiment of the invention.

FIG. 1 is a diagram illustrating an example where a sound signal is acquired by a robot mounted with a reverberation suppressing apparatus according to a first embodiment of the invention. As shown in FIG. 1, a robot 1 includes a body part 11 and a head part 12 (movable part), a leg part 13 (movable part), an arm part 14 (movable part) which are movably connected to the body part 11. In the robot 1, the body part 11 is provided with a receiving part 15 which is carried on the back thereof. The body part 11 includes a speaker 20 (sound output unit 140) and the head part 12 includes a microphone 30. In FIG. 1, the robot 1 is viewed from the side and plural microphones 30 and plural speakers 20 are provided.

The first embodiment of the invention will be first described roughly. As shown in FIG. 1, a sound signal output from the speaker 20 of the robot 1 is described as a speech $S_r$ of the robot 1.

When the robot 1 is speaking, speech interruption by a person 2 is called barge-in. When the barge-in is being generated, it is difficult to recognize the speech of the person 2 due to the speech of the robot 1.

When the person 2 and the robot 1 speak, a sound signal $H_u$ of the person 2 including a reverberation sound, which is the speech $S_u$ of the person 2 delivered via a space, and a sound signal $H_r$ of the robot including a reverberation sound, which is the speech $S_r$ of the robot 1 delivered via the space, are input to the microphone 30 of the robot 1.

In this embodiment, the speech $S_u$ of the person 2 is separated by canceling, that is, by suppressing, the reverberation sound using an MCSB-ICA (Multi-Channel Semi-Blind ICA) based on the independent component analysis (ICA). In the MCSB-ICA, the sound signal acquired by the microphone 30 of the robot 1 and the known speech of the robot 1 are whitened, a separation filter is calculated by performing a repeated process using the whitened values so that the value of a first evaluation function is the minimum by the ICA, and the reverberation component is suppressed from the sound signal acquired by the microphone 30 to separate the sound signal of the person 2 therefrom, thereby calculating the sound signal $S_u$ of the speech of the person 2. In the ICA, a step size which is the magnitude of update is calculated using a segmented linear model including several segments. Note that the process in which a repeated process is performed so that the degree of separation of the sound source signals exceeds the predetermined value may be performed, depending on the evaluation function to be used, in such a manner that the repeated process is performed so that the value of the first evaluation function is minimized using the ICA, or the repeated process is performed so that the value of the first evaluation function is maximized.

Figure 2:
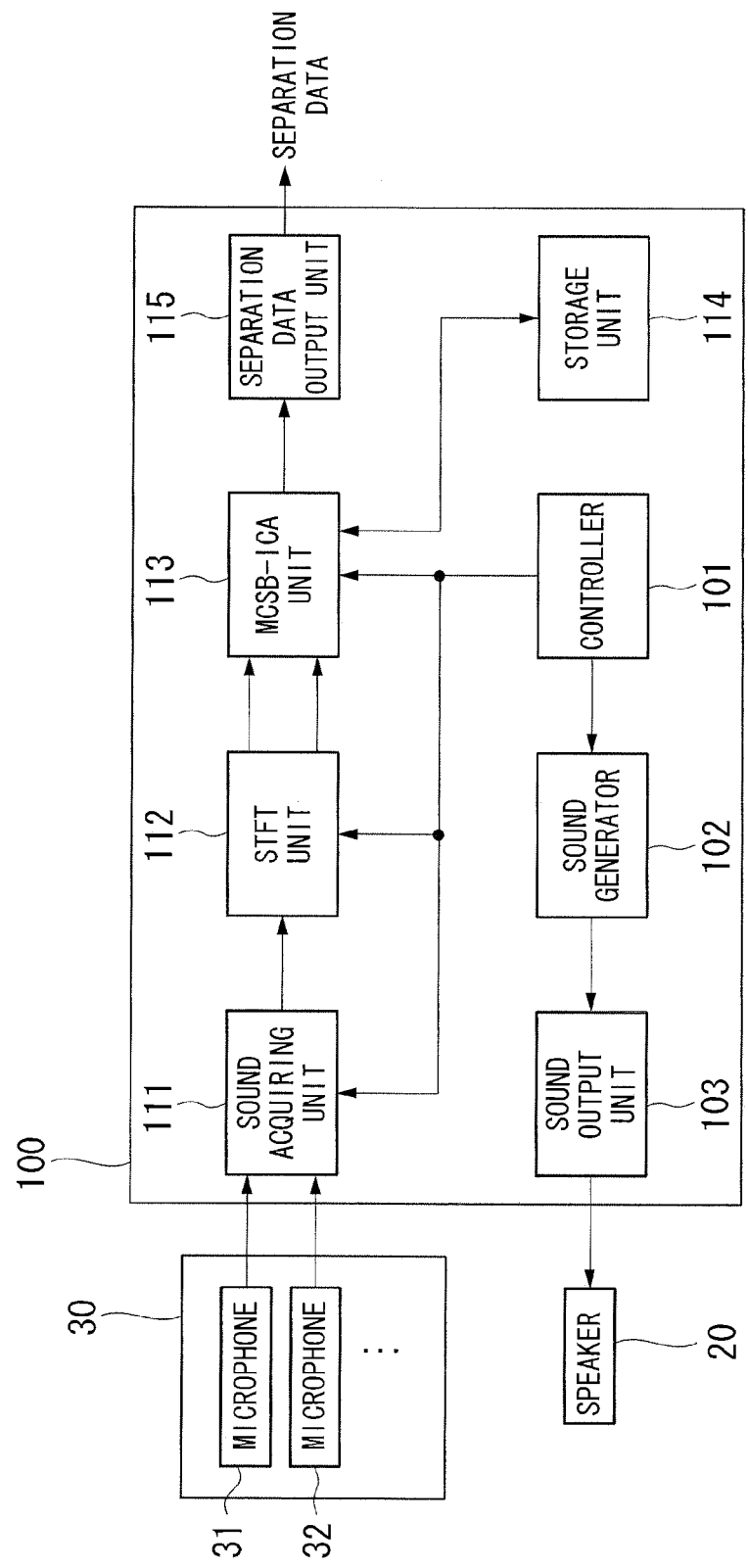
FIG. 2 is a block diagram illustrating a configuration of the reverberation suppressing apparatus according to the first embodiment of the invention.

FIG. 2 is a block diagram illustrating the configuration of the reverberation suppressing apparatus 100 according to this embodiment. As shown in FIG. 2, a microphone 30 and a speaker 20 are connected to the reverberation suppressing apparatus 100 and the microphone 30 includes plural microphones 31, 32, .... The reverberation suppressing apparatus 100 includes a controller 101, a sound generator 102, a sound output unit 103, a sound acquiring unit 111, an STFT unit 112, an MCSB-ICA unit 113, a storage unit 114, and a separation data output unit 115.

The controller 101 outputs an instruction to generate and output a sound signal as the speech of the robot 1 to the sound generator 102, and outputs a signal representing that the robot 1 is in speech to the STFT unit 112 and the MCSB-ICA unit 113.

The sound generator 102 generates the sound signal as the speech of the robot 1 based on the instruction from the controller 101, and outputs the generated sound signal to the sound output unit 103 and the STFT unit 112.

The generated sound signal is input to the sound output unit 103. The sound output unit 103 amplifies the input sound signal to a predetermined level and outputs the amplified sound signal to the speaker 20.

The sound acquiring unit 111 acquires the sound signal collected by the microphone 30 and outputs the acquired sound signal to the STFT unit 112.

Figure 3A:
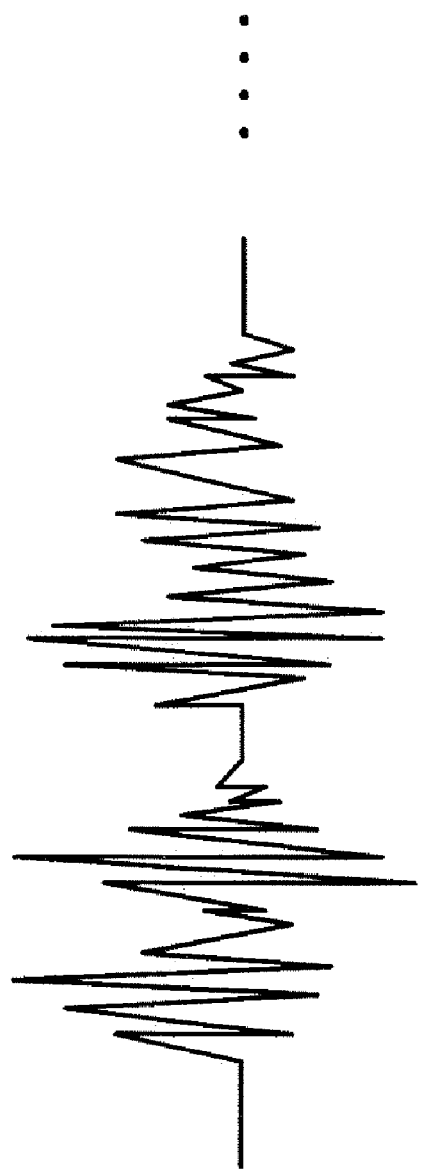
FIGS. 3A and 3B are diagrams illustrating an STFT process according to the first embodiment of the invention.
Figure 3B:
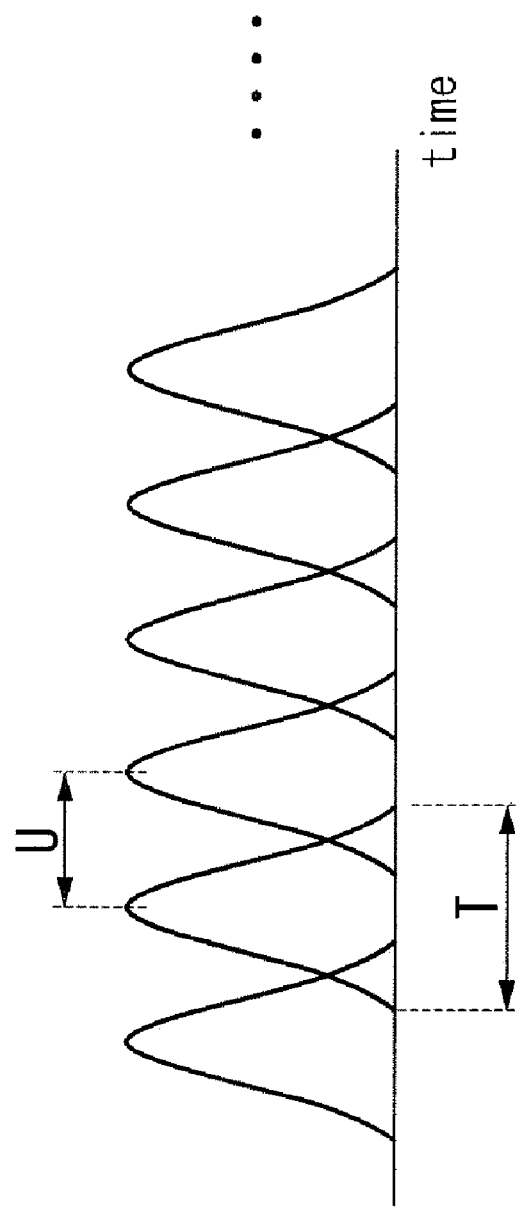

The acquired sound signal and the generated sound signal are input to the STET (Short-Time Fourier Transformation) unit (whitening unit) 112. The STFT unit 112 applies a window function such as a Hanning window function to the acquired sound signal and the generated sound signal and analyzes the signals within a finite period while shifting an analysis position. The STFT unit 112 performs an STFT process on the acquired sound signal every frame t to convert the sound signal into a signal $x(\omega,t)$ in a time-frequency domain, performs the STFT process on the generated sound signal every frame t to convert the sound signal into a signal $s_r(\omega,t)$ in the time-frequency domain, and outputs the signal $x(w,t)$ and the signal $s_r(\omega,t)$ to the MCSB-ICA unit 113 by the frequency $\omega$. FIGS. 3A and 3B are diagrams illustrating the STFT process. FIG. 3A shows a waveform of the acquired sound signal and FIG. 3B shows a window function which can be applied to the acquired sound signal. In FIG. 3B, reference sign U represents a shift length and reference sign T represents a period in which the analysis is performed. A predetermined value is used as the shift length.

The signal $x(\omega,t)$ and the signal $s_r(\omega,t)$ converted by the STFT unit 112 are input to the MCSB-ICA unit (a first evaluation function calculation unit, a reverberation component suppressing unit, and a separation matrix updating unit) 113 by the frequency $\omega$. The MCSB-ICA unit 113 calculates a separation filter $W_r$ and separation filters $W_{1u}$ and $W_{2u}$ by repeated processes using the input signals $x(\omega,t)$ and $s_r(\omega,t)$ and the models and coefficients stored in the storage unit 114 in such a manner that the separation filters are select when the degree of separation of the sound source signals exceeds a predetermined value based on the first evaluation function that represents the degree of separation of the direct sound signal $S_u$ of the person 2 from the acquired sound signals. After calculating the separation filters $W_r$, $W_{1u}$, and $W_{2u}$, the direct speech signal s(t) of the person 2 is estimated and separated from the sound signal acquired by the microphone 30 using the calculated separation filters $W_r$, $W_{1u}$, and $W_{2u}$ and the separated direct speech signal is output to the separation data output unit 115.

Figure 4:
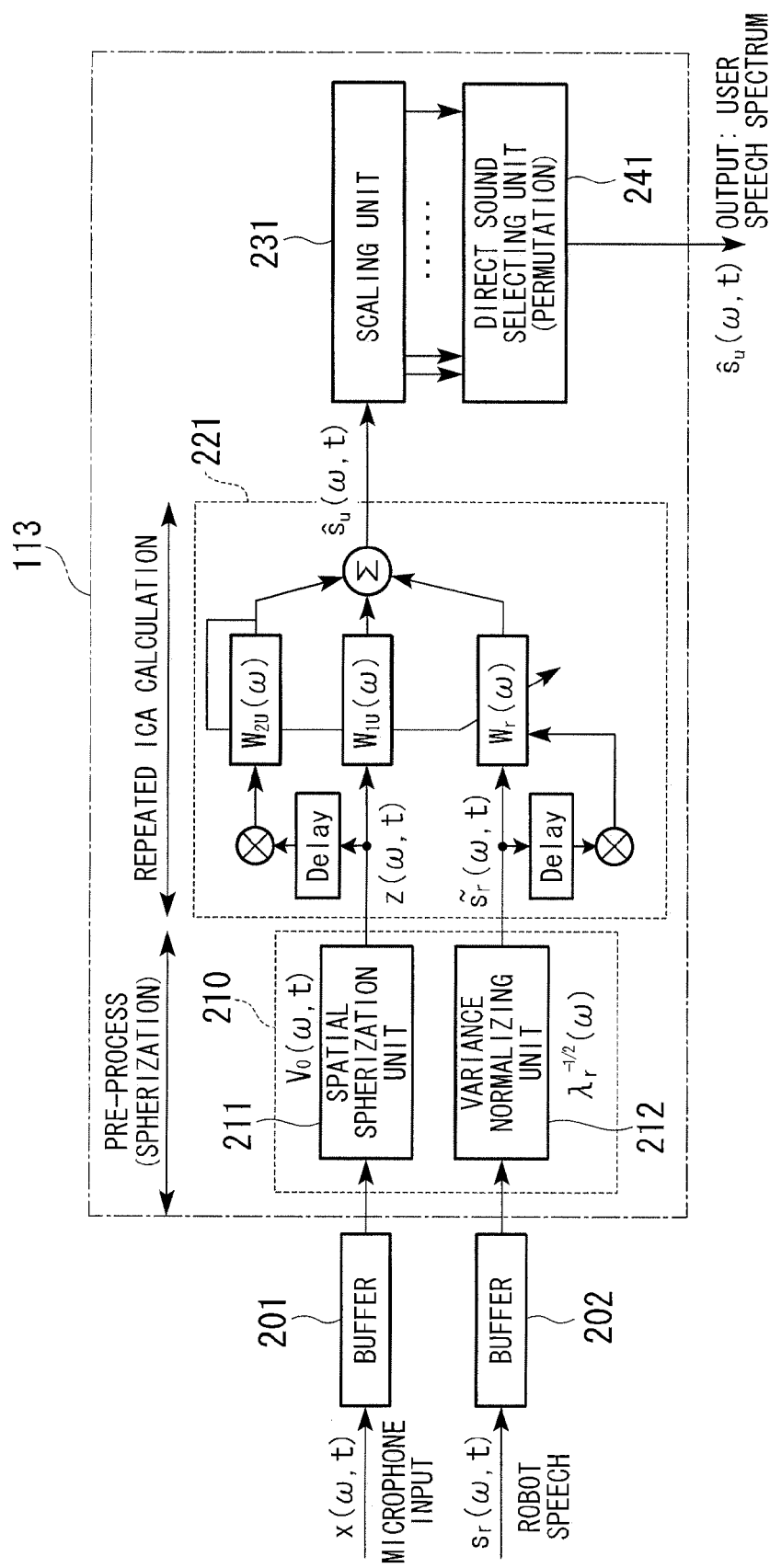
FIG. 4 is a diagram illustrating an internal configuration of an MCSB-ICA unit according to the first embodiment of the invention.

FIG. 4 is a diagram illustrating the internal configuration of the MCSB-ICA unit 113. As shown in FIG. 4, the MCSB-ICA unit 113 includes a forcible spatial spherization unit 210, an ICA unit 221, a scaling unit 231, and a direct sound selecting unit 241. The forcible spatial spherization unit 210 includes a spatial spherization unit 211 and a variance normalizing unit 212.

The signal $x(\omega,t)$ input from the STFT unit 112 is input to the spatial spherization unit 211 of the forcible spatial spherization unit 210 via a buffer 201, and the signal $s_r(\omega,t)$ input from the STFT unit 112 is input to the variance normalizing unit 212 of the forcible spatial spherization unit 210 via a buffer 202. The forcible spatial spherization unit 210 whitens the input signals $x(\omega,t)$ and $s_r(\omega,t)$ by spherization and variance normalization and outputs the whitened signals to the ICA unit 221. The whitened signals are input to the ICA unit 221 from the forcible spatial spherization unit 210. The ICA unit 221 repeatedly performs the ICA process on the input signals to calculate a separation filter so that the value of the first evaluation function is the minimum, and calculates the separated sound signal using the calculated separation filter. Then, the ICA unit 221 outputs the calculation result to the scaling unit 231 and outputs the scaled signal to the direct sound selecting unit 241. The scaling unit 231 performs a scaling process using a projection back process. The direct sound selecting unit 241 selects the signal having the maximum power from the input signals and outputs the selected signal to the separation data output unit 115.

Models of the sound signal acquired by the microphone 30 of the robot 1, separation models for analysis, parameters used for the analysis, and update rules of the MCSB-ICA unit 113 are written and stored in the storage unit 114 in advance and the calculated separation filters $W_r$, $W_{1u}$, and $W_{2u}$ are written and stored therein during the process of update.

The direct speech signal separated by the MCSB-ICA 113 is input to the separation data output unit 115, and the input direct speech signal is output, for example, to a sound recognizing unit (not shown).

A separation model for separating a necessary sound signal from the sound acquired by the robot 1 will be described. The sound signal acquired by the microphone 30 of the robot 1 can be defined like a finite impulse response (FIR) model of Expression 1 in the storage unit 114.

$$x(t) = \sum_{n=0}^{N} h_u(n)s_u(t-n) + \sum_{m=0}^{M} h_r(m)s_r(t-n) \quad \text{Expression 1}$$

In Expression 1, signs $x_1(t), \ldots, x_L(t)$ (where L is a microphone number) are speckles of the plural microphones 30, x(t) is a vector $[x_1(t), x_2(t), \ldots, x_L(t)]T$, su(t) is the speech of the person 2, sr(t) is the spectrum of the robot 1, hu(n) is an N-dimension FIR coefficient vector of the sound spectrum of the person 2, and hr(m) is an M-dimension FIR coefficient vector of the robot 1. Expression 1 represents a model at time t when the robot 1 acquires a sound signal via the microphone 30.

The sound signal collected by the microphone 30 of the robot 1 is modeled and stored in advance as a vector X(t) including a reverberation component as expressed by Expression 2 in the storage unit 114. The sound signal as the speech of the robot 1 is modeled and stored in advance as a vector $s_r(t)$ including a reverberation component as expressed by Expression 3 in the storage unit 114.

$$X(t) = [x(t), x(t-1), \ldots, x(t-N)]^T \quad \text{Expression 2}$$

$$S_r(t) = [s_r(t), s_r(t-1), \ldots, s_r(t-M)]^T \quad \text{Expression 3}$$

In Expression 3, $s_r(t)$ is the sound signal emitted from the robot 1, $s_r(t-1)$ represents that the sound signal is delivered via a space with a delay of "1", and $s_r(t-M)$ represents that the sound signal is delivered via a space with a delay of "M". That is, it represents that the distance from the robot 1 is great and the reverberation component increases as the delay increases.

To independently separate the known direct sounds $s_r(t)$ and X(t−d) and the direct speech signal $s_u$ of the person 2 using the independent component analysis, the separation model of the MCSB-ICA is defined by Expression 4 and is stored in the storage unit 114.

$$\begin{pmatrix} \hat{s}(t) \\ X(t-d) \\ S_r(t) \end{pmatrix} = \begin{pmatrix} W_{1u} & W_{2u} & W_r \\ 0 & I_2 & 0 \\ 0 & 0 & I_r \end{pmatrix} \begin{pmatrix} x(t) \\ X(t-d) \\ S_r(t) \end{pmatrix} \quad \text{Expression 4}$$

In Expression 4, d (which is greater than 0) is an initial reflecting gap, X(t−d) is a vector obtained by delaying X(t) by d, Expression 5 is an estimated signal vector of L dimension. In Expression 5, the direct speech signal of the person 2 and several reflected sound signals are included.

$$\hat{S}(t) \quad \text{Expression 5}$$

In Expression 4, $W_{1u}$ is a L×L blind separation matrix (separation filter), $W_{2u}$ is an L×L(N+1) separation matrix (separation filter), and $W_r$ is an L×(M+1) separation matrix with the reverberation canceled. $I_2$ and $I_r$ are unit matrixes having the corresponding sizes.

Parameters for solving Expression 4 will be described. In Expression 4, a separation parameter set W={$W_{1u}$, $W_{2u}$, $W_r$} is estimated as a difference scale between products of a coupling probability density function and peripheral probability density.

functions (peripheral probability density functions representing the independent probability distributions of the individual parameters) of s(t), X(t−d), and sr(t) so that KL (Kullback-Leibler) amount of information is minimized. The explicit first evaluation function is expressed by Expression 6.

$$J(W) = -\sum_{i=1}^{L} E[\log p_i(s_i(t))] - \log|\det W_{1u}| + H \quad \text{Expression 6}$$

In Expression 6, $p_i(s_i)$ is the coupling probability density function of probability variable $s_i$, E[ ] is a time averaging operator, and H is coupling entropy of {x(t), X(t−d), $S_r(t)$}.

The MCSB-ICA unit 113 estimates the separation parameter set W by repeatedly updating the separation filters in accordance with rules of Expressions 7 to 10 so that the first evaluation function of Expression 6 is the minimum and the KL amount of information is minimized using a natural gradient method. Expressions 7 to 10 are written and stored in advance in the storage unit 114.

$$D = \Lambda - E[\phi(\hat{s}(t))\hat{s}^H(t)] \quad \text{Expression 7}$$

$$W_{1u}^{[j+1]} = W_{1u}^{[j]} + \mu D W_{1u}^{[j]} \quad \text{Expression 8}$$

$$W_{2u}^{[j+1]} = W_{2u}^{[j]} + \mu(D W_{2u}^{[j]} - E[\phi(\hat{s}(t))X^H(t-d)]) \quad \text{Expression 9}$$

$$W_r^{[j+1]} = W_r^{[j]} + \mu(D W_r^{[j]} - E[\phi(\hat{s}(t))S_r^H(t)]) \quad \text{Expression 10}$$

In addition, in Expression 7 and Expressions 9 and 10, superscript H represents a conjugate transpose operation (Hermitian transpose). In Expression 7, $\Lambda$ represents a nonholonomic restriction matrix, that is, a diagonal matrix of Expression 11.

$$E[\phi(\hat{s}(t))\hat{s}^H(t)] \quad \text{Expression 11}$$

In Expressions 8 to 10, u is a step-size parameter representing the magnitude of update, $\phi(x)$ a nonlinear function vector $[\phi(x_1), \ldots, \phi(x_L)]$, which can be expressed by $$\phi(x) = -\frac{d}{dx}\log p(x). \quad \text{Expression 12}$$

The coupling probability density function of a sound source is $p(x)=\exp(-|x|/\sigma^2)/(2\sigma^2)$ which is a coupling probability density function resistance to noise and $\phi(x)=x^*/(2\sigma^2|x|)$, where $\sigma^2$ is the variance. It is assumed that $x^*$ is the conjugate of x. These two functions are defined in a continuous region $|x|>\epsilon$.

To improve the convergence property of the ICA, the forcible spatial spherization unit 210 performs the whitening process by performing the forcible spatial spherization process which is an approximation of the spherization and the variance normalization process as a pre-process. In $p(x)=\exp(-|x|/\sigma^2)/(2\sigma^2)$, since the input signal is spherized (non-correlated) by the spherization and the variance is normalized, it is assumed that the variance $\sigma^2$ is almost 1.

The forcible spatial spherization will be described. The transfer characteristic matrix H of L(N+1)×(K+J+1) related to the user's speech is expressed by Expression 13. Here, L is the number of microphones in the robot 1. N is the number of columns of the transfer characteristic matrix H, K is the number of rows of the transfer characteristic matrix H, and J is a constant.

$$H = \begin{pmatrix} h(0) & \cdots & \cdots & h(K) & \cdots & 0 \\ \vdots & \ddots & \ddots & & \ddots & \vdots \\ 0 & \cdots & h(0) & \cdots & \cdots & h(K) \end{pmatrix} \quad \text{Expression 13}$$

In Expression 13, h(i) is $h(i)=[h_1(i), h_2(i), \ldots, h_L(i)]^T$. When $L(N+1)=K+J+1$ is satisfied, the transfer characteristic matrix H is a square matrix of $L(N+1) \times L(N+1)$ and can be thus described in an instantaneous mixture system. The total procedure including the known robot speech can be expressed by Expression 14.

$$\begin{pmatrix} X(t) \\ S_r(t) \end{pmatrix} = \begin{pmatrix} H & H_r \\ 0 & I \end{pmatrix} \begin{pmatrix} S_u(t) \\ S_r(t) \end{pmatrix} \quad \text{Expression 14}$$

In Expression 14, I is a unit matrix of $(M+1) \times (M+1)$ and $H_r$ is the transfer characteristic matrix which is the known matrix of $(L+1) \times (M+1)$ as expressed by $$H_r = \begin{pmatrix} h_r(0) & \cdots & h_r(M) \\ \vdots & \ddots & \vdots \\ 0 & \cdots & h_r(0) \end{pmatrix}. \quad \text{Expression 15}$$

In Expression 15, $h_r(i)$ is Expression 16.

$$h_r(i) = \begin{pmatrix} h_{1r}(i) \\ \vdots \\ h_{Lr}(i) \end{pmatrix} \quad \text{Expression 16}$$

The forcible spatial spherization unit 210 performs the spherization by the use of Expressions 17 and 18 using an eigen value $\Lambda$ of a spatial-temporal correlation matrix R and an eigen vector E of the spatial-temporal correlation matrix R.

$$R = \begin{pmatrix} E[X(t)X^H(t)] & E[X(t)S_r^H(t)] \\ E[S_r(t)X^H(t)] & E[S_r(t)\hat{S}_r^H(t)] \end{pmatrix} \quad \text{Expression 17}$$

$$Z(t) = E\Lambda^{-\frac{1}{2}} E^H \begin{pmatrix} X(t) \\ S_r(t) \end{pmatrix} \quad \text{Expression 18}$$

To further reduce the amount of calculation in the eigen value analysis, the forcible spatial spherization unit 210 forcibly removes the temporal correlation and forcibly removes the correlation between the known signal and the measured signal by the use of Expressions 19 to 22.

$$E[X(t)X^H(t)] = \begin{pmatrix} R(0) & \cdots & 0 \\ \cdots & \ddots & \vdots \\ 0 & \cdots & R(0) \end{pmatrix} \quad \text{Expression 19}$$

$$E[S_r(t)S_r^H(t)] = \begin{pmatrix} \lambda_r & \cdots & 0 \\ \vdots & \ddots & \vdots \\ 0 & \cdots & \lambda_r \end{pmatrix} \quad \text{Expression 20}$$

$$E[X(t)S_r^H(t)] = 0 \quad \text{Expression 21}$$

$$E[S_r(t)X^H(t)] = 0 \quad \text{Expression 22}$$

In Expressions 19 to 22, the spatial correlation matrix R(0) is $E[x(t)x^H(t)]$ and the variance $\lambda_r$ is expressed by Expression 23.

$$E[s_r(t)s_r^H(t)] \quad \text{Expression 23}$$

The calculation of Expressions 17 and 18 using Expressions 19 to 22 means that the spatial spherization is performed on the measured signals (the speech of the robot 1 acquired by the microphone 30 of the robot 1 and the speech of the person 2) and that the normalization of scales is performed on the known signal (speech of the robot 1). By the forcible removal of the temporal correlation and the forcible removal of the correlation between the known signal and the measured signal, the measured signal X(t) is converted by Expression 24 and the known signal $S_r(t)$ is converted by Expression 26, whereby the signals are subjected to the forcible spatial spherization process.

That is, the converted signal $x(\omega,t)$ is input to the spatial spherization unit 211 of the MCSB-ICA unit 113 every frequency $\omega$ and the spatial spherization process is sequentially performed using the frequency $\omega$ as an index and using Expression 24, thereby calculating z(t).

$$z(t) = V_u x(t) \quad \text{Expression 24}$$

Here, $V_u$ is Expression 25.

$$V_u = E_u \Lambda^{-\frac{1}{2}} E_u^H \quad \text{Expression 25}$$

In Expression 25, $E_u$ and $\Lambda_u$ are an eigen vector matrix and an eigen diagonal matrix $R_u = E[x(t)x^H(t)]$.

The converted signal $S_r(\omega,t)$ is input to the variance normalizing unit 212 of the MCSB-ICA unit 113 every frequency $\omega$ and the scale normalizing process is performed using the frequency $\omega$ as an index and using Expression 26.

$$\tilde{s}_r(t) = \lambda_r^{-\frac{1}{2}} s_r(t) \quad \text{Expression 26}$$

After the forcible spatial spherization, x and $S_r$ of Expression 4 and Expressions 7 to 10 are inserted into z and Expression 5. The spatial spherization unit 211 outputs the calculated $z(\omega,t)$ to the ICA unit 221, and the variance normalizing unit 212 outputs the value of Expression 26 with the scale normalized to the ICA unit 221.

An recursive expression of the separation process will be described. First, in performing the process, Expression 4 is rewritten as Expression 27.

$$\hat{s}_r(t) = \sum_{n=0}^{N} W_u(n)x(t-n) + \sum_{m=0}^{M} W_r(m)s_r(t-m) \quad \text{Expression 27}$$

In Expression 27, $W_u(n)$ is an L×L separation matrix and $W_r(m)$ is an L×1 separation matrix. To simplify the calculation, the range of $W_u(n)$ (where n is equal to or greater than 1 and less than d) is omitted and it is thus assumed that $W_u(n)$ is equal to zero in this range. $W_{1u}$ corresponds to $W_u(0)$, $W_{2u}$ corresponds to $[W_u(d), \ldots, W_u(N)]$, and $W_r$ corresponds to $[W_u(0), \ldots, W_u(M)]$. Expressions 8 to 10 can be rewritten as Expression 28 using an increment sign $\Delta W_x$. $W_x$ represents simplified $W_r$, $W_{1u}$, and $W_{2u}$.

$$W_x^{[j+1]} = W_x^{[j]} + \mu \Delta W_x^{[j]} \qquad \text{Expression 28}$$

The recursive expression of the estimated Expression 5 can be expressed by Expression 29 using Expression 27 and $\Delta W_x$.

$$\hat{s}^{[j+1]}(t) = \sum_{n=0}^{N}(W_u^{[j]}(n) + \mu\Delta W_u^{[j]}(n))x(t-n) + \qquad \text{Expression 29}$$

$$\sum_{m=0}^{M}(W_r^{[j]}(m) + \mu\Delta W_u(m))s_r(t-m)$$

When Expressions 30 and 31 are assumed, Expression 29 can be expressed by a recursive expression as Expression 32.

$$y_u^{[j]}(t-n) = \Delta W_u^{[j]}(n)x(t-n) \qquad \text{Expression 30}$$

$$y_r^{[j]}(t-m) = \Delta W_u^{[j]}(m)s_r(t-m) \qquad \text{Expression 31}$$

$$\hat{s}^{[j+1]}(t) = \hat{s}^{[j]}(t) + \sum_{n=0}^{N}\mu y_u^{[j]}(t-n) + \sum_{m=0}^{M}\mu y_r^{[j]}(t-m) \qquad \text{Expression 32}$$

To generalize the estimation of the step size u which is the magnitude of update, the coefficients for the step size µ are corrected so that the sound sources expressed by Expression 33, the delay frames m and n, and the repeated coefficient j are different.

$$\hat{s}_i^{[j+1]} \qquad \text{Expression 33}$$

By using L×L diagonal step-size matrixes of Expressions 34 and 35 having different frames, Expression 33 can be rewritten as Expression 36.

$$\mu_r^{[j]}(n) = \text{diag}(\mu_{1,u}^{[j]}(n), \ldots, \mu_{L,u}^{[j]}(n)) \qquad \text{Expression 34}$$

$$\mu_r^{[j]}(m) = \text{diag}(\mu_{1,r}^{[j]}(m), \ldots, \mu_{L,r}^{[j]}(m)) \qquad \text{Expression 35}$$

$$\hat{s}^{[j+1]}(t) = \qquad \text{Expression 36}$$

$$\hat{s}^{[j]}(t) + \sum_{n=0}^{N}\mu_u^{[j]}(n)y_u(t-n) + \sum_{m=0}^{M}\mu_r^{[j]}(m)y_r(t-m)$$

In Expressions 34 and 35, sign diag represents a diagonal component. With the updating of Expression 35, Expression 28 as the updating rule is rewritten as Expression 37.

$$W_x^{[j+1]}(n) = W_x^{[j+1]}(n) + \mu_x^{[j]}(n)\Delta W_x^{[j]}(n) \qquad \text{Expression 37}$$

Expression 38 as the optimal step-size parameter is estimated by minimizing the second evaluation function for the step size in Expression 39.

$$\mu^{[j]} = \{\mu_u^{[j]}, \mu_r^{[j]}\} \qquad \text{Expression 38}$$

$$J(\mu^{[j]}) = J(W^{[j+1]}) - J(W^{[j]}) \propto J(W^{[j+1]}) \qquad \text{Expression 39}$$

Expression 39 can be rewritten as Expression 40 using Expression 6.

$$J(\mu^{[j]}) = -\sum_{i=1}^{L} E[\log p_i(s_i^{[j+1]}(t))] - \log|\det W_u^{[j+1]}(0)| \qquad \text{Expression 40}$$

It is assumed that Expression 41 which is the second term in Expression 40 has a value much smaller than that of Expression 42 which is the first term. By this assumption, Expression 40 is approximated to Expression 43.

$$-\log|\det W_u^{[j+1]}(0)| \qquad \text{Expression 41}$$

$$-\sum_{i=1}^{L} E[\log p_i(s_i^{[j+1]}(t))] \qquad \text{Expression 42}$$

$$J(\mu^{[j]}) \approx -\sum_{i=1}^{L} E[\log p_i(s_i^{[j+1]}(t))] \qquad \text{Expression 43}$$

As the approximation result, it is possible to independently minimize Expression 44 instead of minimizing $J(\mu)$.

$$-E[\log p_i(s_i^{[j+1]}(t))]$$

Since Expression 44 has plural parameters to be estimated, the number of parameters is further reduced to reduce the calculation cost.

The method of further suppressing the calculation cost will be described with reference to FIGS. 5A and 5B. FIGS. 5A and 5B are diagrams illustrating the segmented linear modeling of the step size. FIG. 5A is a diagram illustrating the step size when the segmented linear modeling is not performed and FIG. 5B is a diagram illustrating the step size when the segmented linear modeling is performed. That is, as shown in FIG. 5B, when all the step-size functions are calculated, the amount of calculation is great. Accordingly, the amount of calculation is greatly reduced by dividing the step size function into several segments and linearly approximating each segment.

The step size parameter of the i-th element in Expression 45 which is the measured term and Expression 46 which is the term of the known sound source is almost equal to the term of the number of delay frames, that is, Expression 47.

$$\mu_{i,u}^{[j]}(n) \qquad \text{Espression 45}$$

$$\mu_{i,u}^{[j]}(m) \qquad \text{Expression 46}$$

$$\mu_i^{[j]}(n) = \mu_{i,u}^{[j]}(n) = \mu_{i,r}^{[j]}(n) \qquad \text{Expression 47}$$

Here, the i-th element in Expression 48 is replaced with Expression 49 and the i-th element in Expression 50 is replaced with Expression 51, Expression 36 can be simplified as Expression 52.

$$y_u^{[j]} \qquad \text{Expression 48}$$

$$y_{i,u}^{[j]} \qquad \text{Expression 49}$$

$$y_r^{[j]} \qquad \text{Expression 50}$$

$$y_{i,r}^{[j]} \qquad \text{Expression 51}$$

$$\hat{s}^{[j+1]}(t) = \hat{s}_i^{[j]} + \sum_{n=0}^{N} \mu_i^{[j]}(n)\left(y_{i,u}^{[j]}(t-n) + y_{i,r}^{[j]}(t-n)\right)$$ Expression 52

When Expression 53 is inserted into Expression 52, Expression 54 is obtained.

$$y_i^{[j]}(t-n) = y_{i,u}^{[j]}(t-n) + y_{i,r}^{[j]}(t-n)$$ Expression 53

$$\hat{s}^{[j+1]}(t) = \hat{s}_i^{[j]} + \sum_{n=0}^{N} \mu_i^{[j]}(n) y_{i,u}^{[j]}(t-n)$$ Expression 54

As shown in FIG. 5B, $\mu_i(n)$ is approximated to segmented linear functions divided into P segments and is defined by Expression 55.

$$\mu_i^{[j]}(n) = \begin{cases} \mu_{i,p}^{[j]} + \dfrac{n-B}{B_{p+1}-B_p}\left(\mu_{i,p+1}^{[j]} - \mu_{i,p}^{[j]}\right) & (B_p \leq n \leq B_{p+1}) \\ 0 & \text{otherwise} \end{cases}$$ Expression 55

In Expression 55, Expressions 56 and 57 represent end points 301 and 302 in the p-th segment $[B_p, B_{p+1}]$ of n. In FIG. 5B, it is assumed that the value of at an end point of the final segment P is zero, that is, Expression 58 is zero. As shown in FIG. 5B, when segments 311 to 313 are connected, the end point 301 which is the connection point between segment 311 and segment 312 has the same value, and the connection point of segment 311 and segment 312 is approximated to be continuous.

$\mu_{i,p}^{[j]}$ Expression 56

$\mu_{i,p+1}^{[j]}$ Expression 57

$\mu_{i,P}^{[j]}$ Expression 58

By using the segmented linear model and Expression 55, the second term of Expression 54 is rewritten as Expression 59.

$$\sum_{n=0}^{N} \mu_i^{[j]}(n) y_i^{[j]}(t-n) = \sum_{p=0}^{P-1} \sum_{n=B_p}^{B_{p+1}-1} \left(\mu_{i,p}^{[j]} + \dfrac{n-B_p}{B_{p+1}-B_p}\left(\mu_{i,p+1}^{[j]} - \mu_{i,p}^{[j]}\right)\right) y_i^{[j]}(t-n)$$ Expression 59

When the parameter is replaced with $Y_i(t,p)$ using Expression 58, it can be expressed by the sum of P terms, whereby Expression 59, that is, Expression 54, can be expressed by Expression 60.

$$\hat{s}^{[j+1]}(t) = \hat{s}_i^{[j]}(t) + \sum_{p=0}^{P-1} \mu_{i,p}^{[j]}(n) Y_i(t,p)$$ Expression 60

Alternatively, it can be expressed by Expression 61 using a matrix expression.

$$\begin{pmatrix} \hat{s}_i^{[j+1]}(t) \\ Y_i(t) \end{pmatrix} = \begin{pmatrix} 1 & \mu_i^{[j]T} \\ 0 & I \end{pmatrix} \begin{pmatrix} \hat{s}_i^{[j]}(t) \\ Y_i(t) \end{pmatrix}$$ Expression 61

In Expression 61, Expression 62 is rewritten as Expression 63 and $Y_i(t)$ is rewritten as Expression 64.

$\mu_i^{[j+1]}$ Expression 62

$[\mu_{i,0}^{[j]}, \ldots, \mu_{i,P-1}^{[j]}]^T$ Expression 63

$[Y_i(t,0), \ldots, Y_i(t,P-1)]^T$ Expression 64

In this way, when the step size is estimated using the segmented linear model, the number of segments P is greatly reduced in comparison with Expression 4, thereby suppressing the calculation cost.

The updating rule of Expression 65 which is the step size from the 1-th repetition to the (1+1)-th repetition is expressed by Expression 66.

$\mu_i^{[j]}$ Expression 65

$\mu_i^{[l+1]} = \mu_i^{[j,l]} - \gamma E[Re[\phi(\hat{S}_i^{[j+1]}) Y_i(t)]]$ Expression 66

In Expression 66, $\gamma$ is a step-size parameter and Re[x] is a real part of x. In adaptation of Expression 66, it is necessary to set a parameter of $\gamma$ and the number of segments P.

To calculate the number of segments P, the convergence speed is increased by the spherization of $Y_i(t)$ using the rules of Expressions 67 and 68.

$$P_i(t) = V_i Y_i(t)$$ Expression 67

$$V_i = E \Lambda_i^{-\frac{1}{2}} E_i^T$$ Expression 68

In Expression 68, $E_i$ is the eigen vector matrix of Expression 69 and $Y_i$ is the eigen value opposed matrix of Expression 69.

$R_i = E[Re[Y_i(t) Y_i^H(t)]]$ Expression 69

$Y_i(t)$ of Expressions 61 to 64 and Expression 66 is inserted into $P_i(t)$. As a result, the step size u in Expression 37 is rewritten as Expression 70.

$\mu_i^{[j]} V_i$ Expression 70

This process can stop the repetition of Expression 65 q times without the convergence of Expression 65 in the j-th repetition of W. This is because this adaptation is a partial estimation of W and thus Expression 65 can be reused as the initial value of Expression 62 in the (j+1)-th repetition. The annealing method of Expression 71 is used to schedule the step-size parameter $\gamma$ in the j-th repetition.

$$\gamma^{[j]} = \dfrac{\alpha_\gamma}{j} + \beta_\gamma$$ Expression 71

In Expression 71, $\alpha_\gamma$ and $\beta_\gamma$ are constant parameters.

Figure 7:
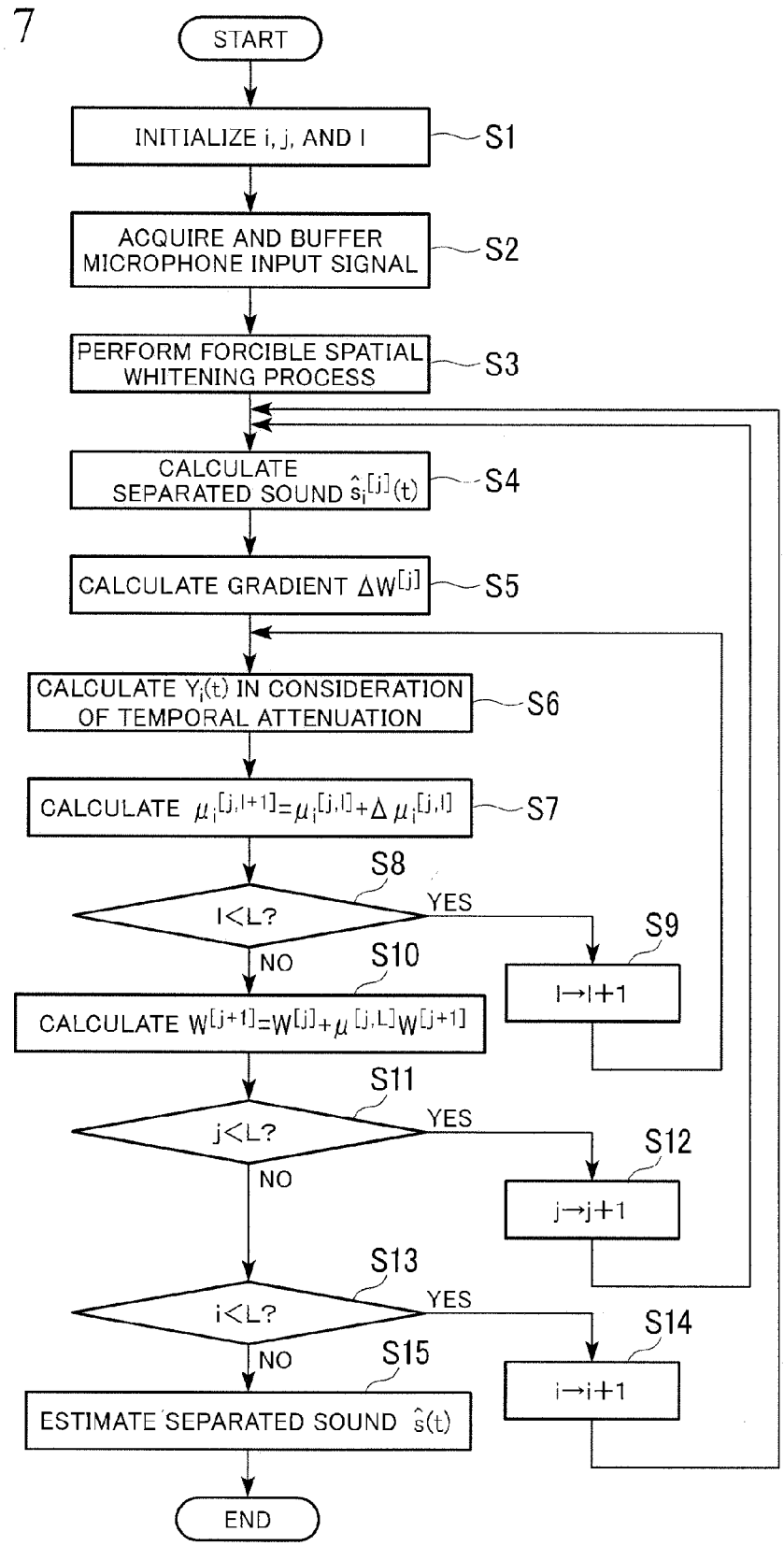
FIG. 7 is a flowchart illustrating a sequence of processes according to the first embodiment of the invention.
Figure 8:
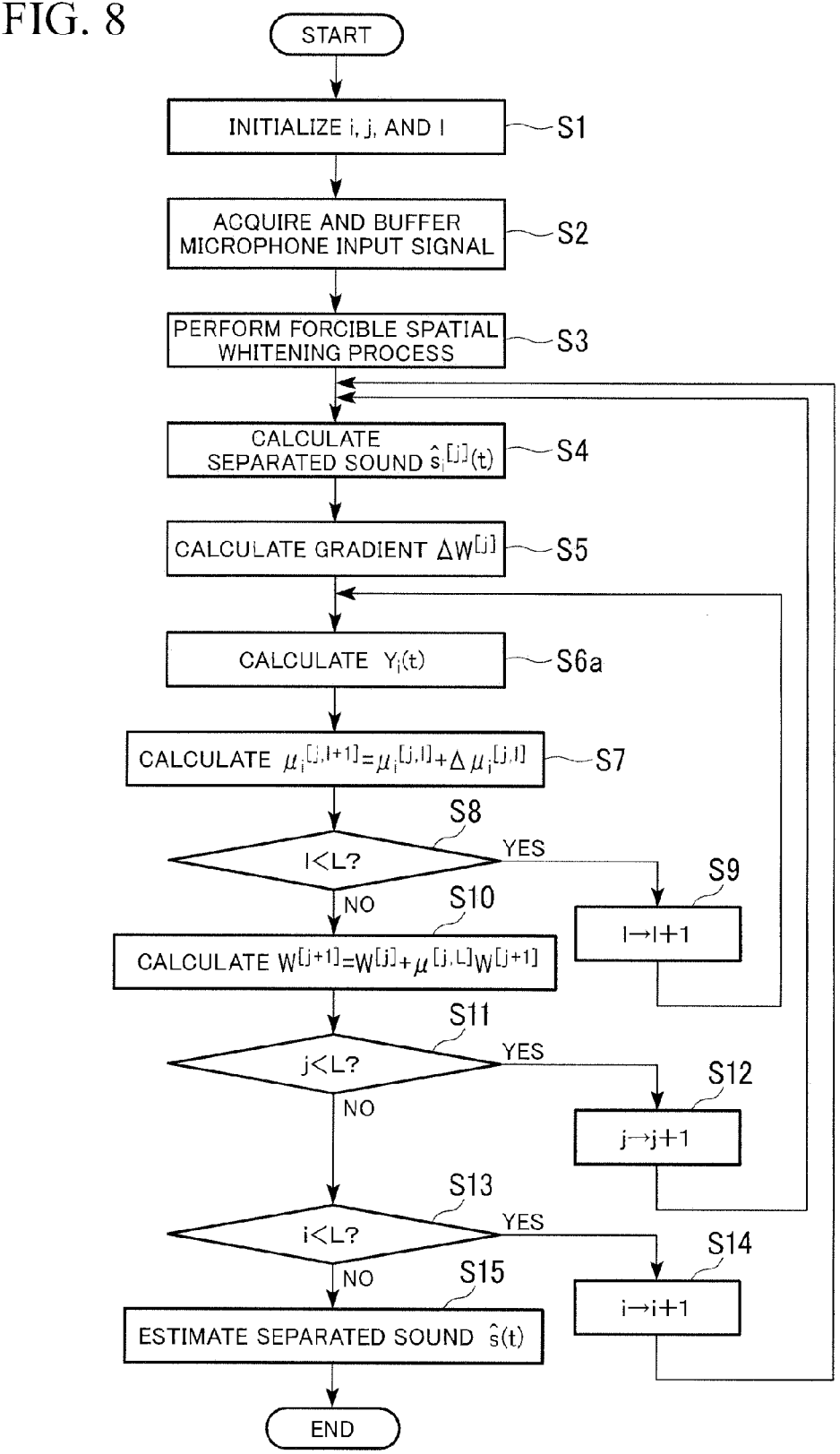
FIG. 8 is a flowchart illustrating a sequence of processes according to a second embodiment of the invention.

The procedure of the reverberation suppressing process will be described with reference to FIG. 1 and FIGS. 5A to 7. FIG. 6 is a diagram illustrating the updating of the step size. FIG. 7 is a flowchart illustrating the flow of processes according to this embodiment. The MCSB-ICA unit 113 initializes (=1) the coefficients i, j, and l used in the repeated process (step S1).

The sound signal collected by the microphone 30 is input to the sound acquiring unit 111 and the input sound signal is output to the STFT unit 112 (step S2). The sound signal collected by the microphone 30 is a sound signal 11, including a reverberation component resulting from the reverberation of the sound emitted from the speaker 20 from the walls, the ceiling, and the floor in addition to the sound signal $S_r$ generated by the sound generator 102.

The sound signal acquired by the microphone 30 and the sound signal generated by the sound generator 102 are input to the STFT unit 112. The input sound signals are subjected to the STFT process every frame t to convert the sound signals into signal $x(\omega,t)$ in the time-space domain, and the converted signal $x(\omega,t)$ is output to the MCSB-ICA unit 113 every frequency co. The STFT unit 112 performs the STFT process on the generated sound signal every frame t to convert the sound signal into the signal $s_r(\omega,t)$ in the time-frequency domain and outputs the converted signal $s_r(\omega,t)$ to the MCSB-ICA unit 113 every frequency $\omega$.

The converted signal $x(\omega,t)$ (the signal based on the input of the microphones) every frequency $\omega$ and the converted signal $s_r(\omega,t)$ (the signal based on the speech of the robot) are input to the forcible spatial spherization unit 210 of the MCSB-ICA unit 113 via the buffer 201 and the buffer 202 and the input signals $x(\omega,t)$ and $s_r(\omega,t)$ are subjected to the forcible spatial spherization (step S3).

The forcible spatial spherization is performed as follows by the spatial spherization unit 211 and the variance normalizing unit 212 of the MCSB-ICA unit 113. The converted signal $x(\omega,t)$ is input to the spatial spherization unit 211 every frequency $\omega$ and is sequentially subjected to the spatial pherization using the frequency $\omega$ as an index and using Expression 24, thereby converting the input signal into $z(t)$. The converted signal $s_r(\omega,t)$ is input to the variance normalizing unit 212 every frequency w and is sequentially subjected to the scale normalization using the frequency $\omega$ as an index and using Expression 26.

The spatial spherization unit 211 outputs the calculated $z(\omega,t)$ to the ICA unit 221 and the variance normalizing unit 212 outputs the value of the normalized expression 26 to the ICA unit 221.

The i-th separated sound $s_i(t)$ is updated by repeatedly performing the processes of steps S4 to S12 L times (where L is the number of microphones 30), and the speech signal of the person 2 with the suppressed reverberation component is extracted by repeatedly performing the processes of steps S4 to S14 L times.

The ICA unit 221 first calculates the predicted values (Expression 5) of the (i=1)-th separated sound $s^{[j]}(t)$ using Expression 36 (step S4).

The ICA unit 221 then calculates the gradients $\Delta W^{[j]}$ of the j-th separation filters $W_{1u}$, $W_{2u}$, and $W_r$ using the calculated predicted values of the separated sound $s_r(t)$ and Expressions 7 to 10 (step S5, the gradient $\Delta W^{[j]}$ calculating process 401 in FIG. 6).

The ICA unit 221 spherizes the parameter $Y_i(t)$ for calculating the first step size u in accordance with the rules of Expressions 67 and 68 in consideration of the temporal attenuation (step S6).

The ICA unit 221 calculates the number of segments P of the segmented linear model using the first $Y_i(t)$ calculated in step S6 and Expression 67.

The ICA unit 221 calculates the step-size parameter $\gamma$ using Expression 71.

The ICA unit 221 calculates and updates the step size of Expression 62 from Expression 66 using the calculated number of segments P and the step-size parameter $\gamma$ (step S7, the step size p. calculating process 403 in FIG. 6).

The repeatedly performed estimation of the step size may be stopped at q times (where q is a natural number equal to or greater than 1 and less than L).

The ICA unit 221 determines whether l is less than a predetermined value L (step S8), adds 1 to l (step S9) and performs the process of step S6 again when l is less than L (Yes in step S8), and performs the process of step S10 when l is equal to or greater than L (No in step S8).

When l is equal to or greater than L (No in step S8), the ICA unit 221 updates the (j+1)-th separation filters $W^{[j+1]}$ next to the separation filters $W_{1u}$, $W_{2u}$, and $W_r$ by the use of Expression 37 (step S10, the gradient $\Delta W^{[j]}$ calculating process 401, the step size p. calculating process 403, the multiplication process 404, and the addition process 405 in FIG. 6). In addition, the ICA unit 221 estimates and updates the separation filters so that J(W) of Expression 6 is decreased.

The ICA unit 221 determines whether j is less than a predetermined value L (step S11), adds 1 to j (step S12) and performs the process of step S4 again when j is less than L (Yes in step S11), and performs the process of step S13 when j is equal to or greater than L (No in step S11).

When j is equal to or greater than L (No in step S11), the ICA unit 221 determines whether i is less than a predetermined value L (step S13), adds 1 to i (step S14) and performs the process of step S6 again when i is less than L (Yes in step S13), and performs the process of step S15 when i is equal to or greater than L (No in step S13).

When i is equal to or greater than L (No in step S13), the ICA unit 221 outputs the estimation result of the calculated separated sounds S(t) to the scaling unit 231 and outputs the scaled signal to the direct sound selecting unit 241. The scaling unit 231 performs the scaling process using a projection back process or the like and the direct sound selecting unit 241 selects the signal having the maximum power from the input signals and outputs the selected signal to the separation data output unit 115 (step S15).

That is, the direct sound selecting unit 241 reduces the reverberation component in the speech signal $h_u$ of the person 2 from the sound signal acquired by the plural microphones 30 and selects the sound signal $S_u$ which corresponds to the direct speech of the person 2.

As described above, the sound signal acquired by the microphones 30 is whitened, the whitened signal is subjected to the ICA process based on the calculated number of segments calculated using the segmented linear model, and the estimated values of the separation filters ($W_r$, $W_{21u}$, and $W_{2u}$) and the separated sound s(t) are updated using the calculated step size in the number of segments P of the segmented linear model. Accordingly, it is possible to enhance the calculation efficiency for suppressing the reverberation and to reduce the reverberation with a high accuracy and with a small amount of calculation. Since the parameter $Y_i(t)$ is spherized to calculate the step size, it is possible to reduce the reverberation with a smaller amount of calculation.

Second Embodiment

A second embodiment of the invention is different from the first embodiment in the process of step S6a. In the first embodiment, the parameter $Y_i(t)$ for calculating the step size u is spherized and calculated, but in the second embodiment, the parameter $Y_i(t)$ of the step size u is calculated without considering the temporal attenuation, that is, without performing the spherization process (step S6a). When the temporal attenuation is not considered, it means that the element of $Y_i(t)$ is 1. That is, depening on the number of elements of the parameter $Y_i(t)$, when the number of elements is 1, the parameter $Y_i(t)$ is calculated without performing the spherization process to calculate the step size u, as in the second embodiment. When the number of elements is equal to or greater than 1, the parameter $Y_i(t)$ is calculated by the spherization to calculate the step size u, as in the first embodiment.

As described above, depending on the number of elements of the parameter $Y_i(t)$, when the number of elements is 1, the parameter $Y_i(t)$ is calculated without performing the spherization process to calculate the step size u. Accordingly, similarly to the first embodiment, it is possible to enhance the calculation efficiency for suppressing the reverberation and to reduce the reverberation with a small amount of calculation and with a high accuracy.

Test Results

The test methods performed using the robot 1 having the reverberation suppressing apparatus according to this embodiment and the test results thereof will be described. FIGS. 9 to 12 show test conditions. The impulse response to the sound data was recorded as 16 kHz in two rooms of a general room (Environment I; reverberation time $RT_{20}$=240 msec, 4.2 m×7.0 m) and hole-like room (Environment II; reverberation time $RT_{20}$=670 msec, 7.55 m×9.55 m)

FIG. 9 shows the data used in the test and the setting conditions of the reverberation suppressing apparatus. As shown in FIG. 9, the impulse response was recorded as 16 kHz sample, the reverberation time was set 240 ms and 670 ms, the distance between the robot 1 and the person 2 was 1.5 m, the angle between the robot 1 and the person 2 was set to 0°, 45°, 90°, −45°, and −90°, the number of used microphones 30 was two (disposed in the head part of the robot 1), the size of the hanning window in the STFT analysis was 64 ms (512 points) and the shift amount was 24 ms (160 points), and the input signal data (16 bits, PCM (Pulse Code Modulation)) was normalized into [−1.0, 1.0]. The number of microphones disposed in the head part of the robot 1 was two.

FIG. 10 is a diagram illustrating the setting of the speech recognition. As shown in FIG. 10, the test set was 200 sentences (Japanese), the training set was 200 people (150 sentences each), the acoustic model was PTM-triphone and three-value HMM (Hidden Markov model), the language model was a vocabulary size of 20 k, the speech analysis was set to a Hanning window size of 32 ms and the shift amount of 10 ms, the features was set to a MFCC (Mel-Frequency Cepstrum Coefficient: spectrum envelope) of 25-dimensions (12-dimension MFCC, Δ12-dimension MFCC, and one-dimension Δpower), and then cepstrum averaging normalization was utilized. In addition, the Δpower was calculated by calculating the signal power in the frame and performing the linear recursion using 5 frames in total of the frame used for the calculation and two frames before and after.

200 Japanese sentences were used for the sound of the user (person 2) and the sound of the robot and theses sentences were added to the corresponding recorded impulse response. The known Julius (http://julius.sourceforge.jp/) was used as the speech recognition engine. The triphone-based acoustic model (three states and four mixtures) was learned (closed language) using 150 sentences of clear sound emitted from 200 male and female tellers. The statistical language model included 20,000 vocabularies and these vocabularies were extracted from newspapers.

The test was carried out in two types of a test where the barge-in is not generated (Test A) and a test where the barge-in is generated (Test B). When the barge-in is not generated, the sound signal acquired by the robot 1 was only the user's sound signal (including the reverberation sound). When the barge-in is generated, the sound signal included the user's sound signal and the sound signal of the robot 1. All data was used to estimate the matrixes $W_{1u}$, $W_{2u}$, and $W_r$ (batch process). In the tests, the PTR (Processing Time Ratio) was evaluated.

As other STFT setting conditions of the tests, the frame gap coefficient was set to d=2, the filter length N for canceling the reverberation and the filter length M for removing the reverberation of the normal separation mode were set to the same value, N (=M) of Environment I was set to 9, and N (=M) of Environment II was set to 23.

The tests were carried out with six conditions shown in FIG. 11. FIG. 11 is a diagram illustrating the test conditions. As shown in FIG. 11, Test Condition 1 includes the use of the method according to this embodiment, the number of segments P=1 and the parameters of $\alpha_\gamma$=0.2 and $\beta_\gamma$=5.0×10$^{-3}$. Test Condition 2 includes the use of the method according to this embodiment, the number of segments P=2 and the parameters of $\alpha_\gamma$=0.2 and $\beta_\gamma$=5.0×10$^{-3}$. Test Condition 3 includes the use of the method according to this embodiment, the number of segments P=0 and the parameters of $\alpha_\gamma$=0.2 and $\beta_\gamma$5.0×10$^{-3}$. In addition, the number of segments P=2 was set to $(B_0, B_1, B_2)$=(0, 4, N) and the number of segments P=1 was set to $(B_0, B_1)$=(0, N). Here, the number of segments P=0 means that the same adaptive step size is used in all $\mu(n)$. The maximum number of repetition times of the sub ICA filter was set to 3.

In Test condition 4, the value calculated in the annealing base was used as the step size ($\lambda$=0.9). In Test Condition 5, the step size $\mu$ was fixed to 0.05. In Test Condition 6, the step size $\mu$ was fixed to 0.1. The step size parameters in the annealing base were calculated as $\alpha_\gamma$=0.6 and $\beta_\gamma$=5.0×10$^{-3}$. The PTR for comparison of the calculation cost due to the ICA process will be described. First, the used adaptation requires $O(LP^2)$ (where L is the number of microphones, P is the number of segments for calculating the step size, and O is the order of an asymptotic method) in the respective repetitions of the separation filters W. When the number of repetition times for estimating W is $p_1$ and the number of repetition times for estimating the step size $u_i$ is $q_i$, the total calculation cost is $p_1(L\cdot2(N+M)+q_1(LP^2))$. On the other hand, the processing time ratio (PTR) to the standard ICA process using the P2 repetitions can be roughly expressed by Expression 72.

$$PTR \propto \frac{p_1(L^2(N+M) + q_1(LP^2))}{p_2(L^2(N+M))} = \left(1 + \frac{q_1 P^2}{L(N+M)}\right)\frac{p_1}{p_2} \quad \text{Expression 72}$$

As Expression 72, when plural microphones 30 are used and the large N and M (where N and M are the number of rows and the number of columns of the separation matrix) aie used, it is more efficient in comparison with the known method.

Figure 12:
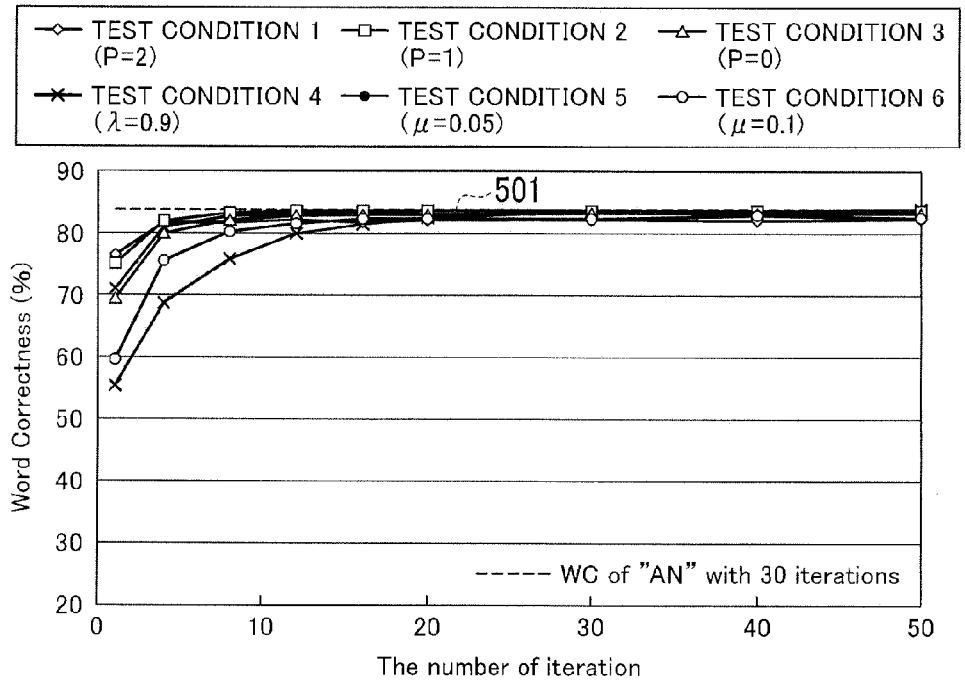
FIG. 12 is a graph illustrating speech recognition rates in Test A (without barge-in) and Environment 1 according to the first embodiment of the invention.
Figure 13:
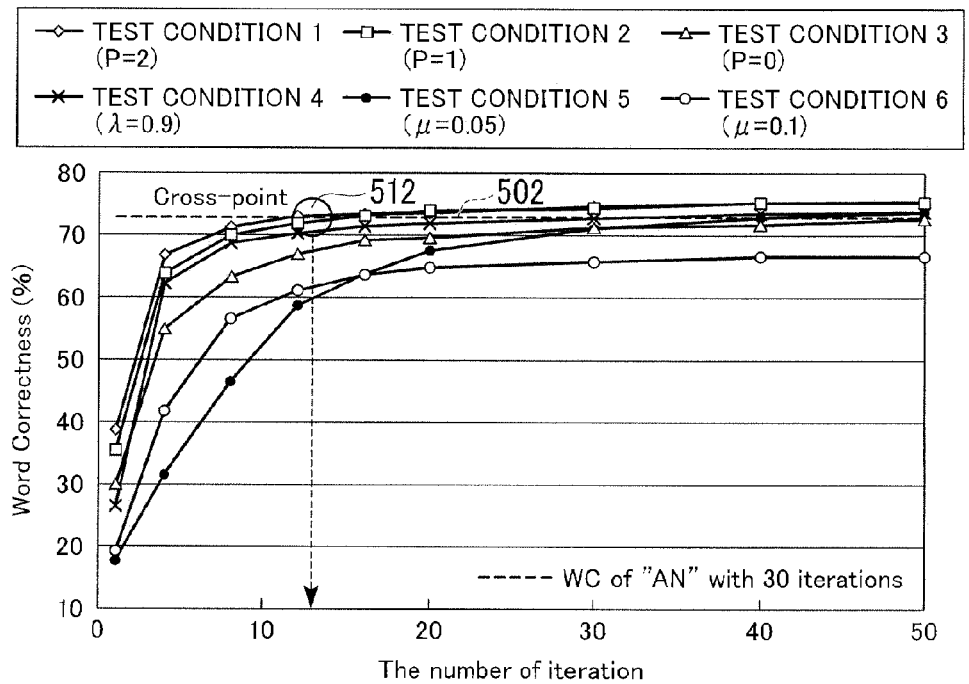
FIG. 13 is a graph illustrating speech recognition rates in Test A (without barge-in) and Environment 2 according to the first embodiment of the invention.
Figure 14:
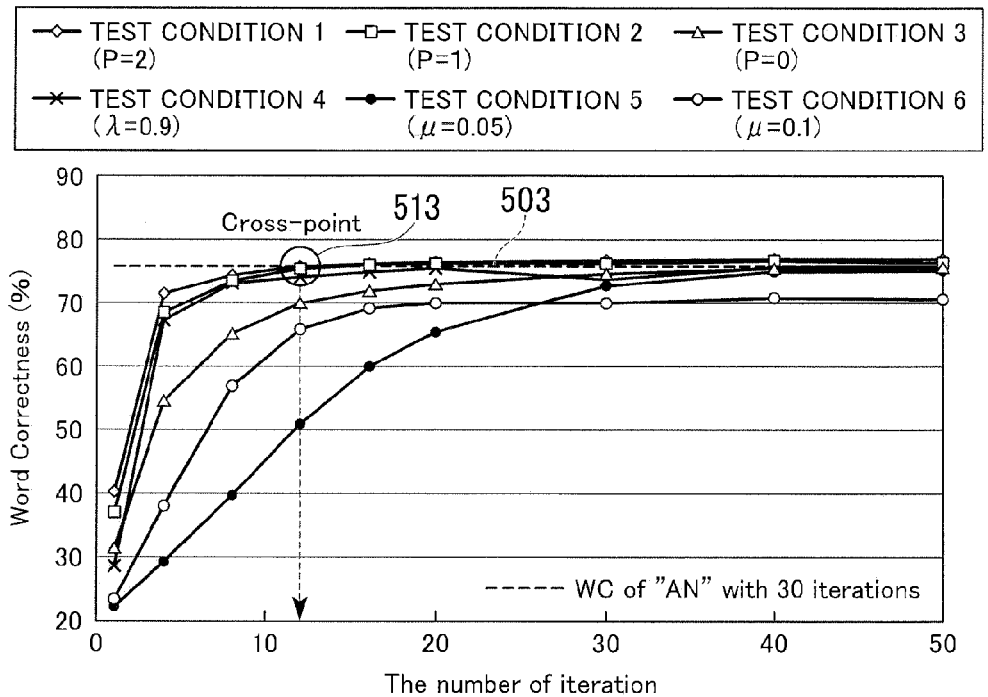
FIG. 14 is a graph illustrating speech recognition rates in Test B (with barge-in) and Environment 1 according to the first embodiment of the invention.
Figure 15:
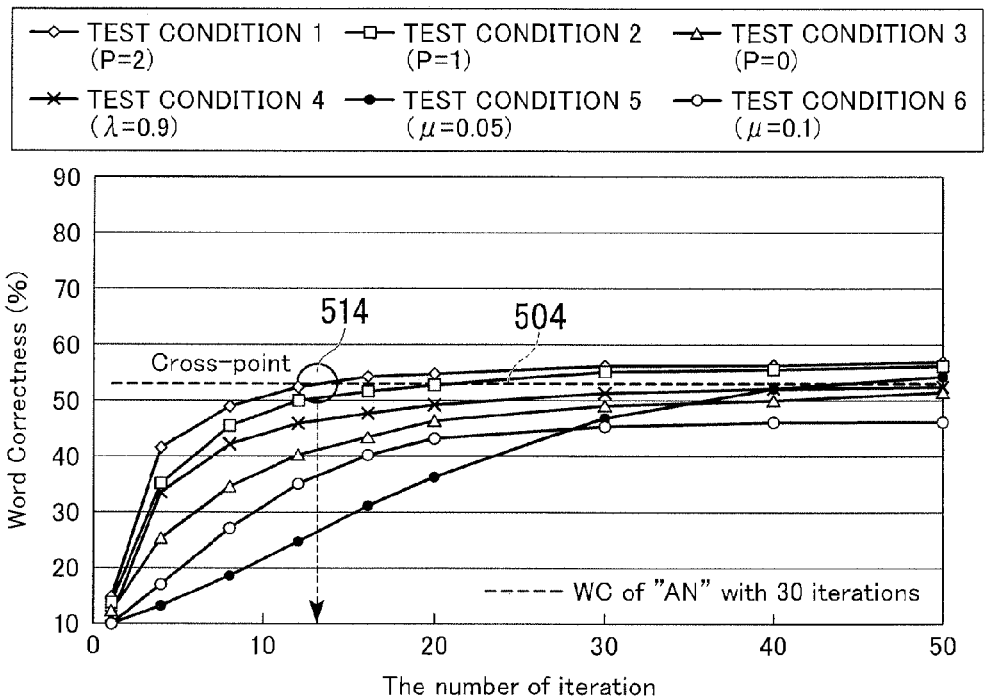
FIG. 15 is a graph illustrating speech recognition rates in Test B (with barge-in) and Environment 2 according to the first embodiment of the invention.

The test results will be described with reference to FIGS. 12 to 16. FIG. 12 is a diagram illustrating the speech recognition rates in Environment 1 where the barge-in is not generated. FIG. 13 is a diagram illustrating the speech recognition rates in Environment 2 where the barge-in is not generated. FIG. 14 is a diagram illustrating the speech recognition rates in Environment 1 where the barge-in is generated. FIG. 15 is a diagram illustrating the speech recognition rates in Environment 2 where the barge-in is generated. For example, the recognition rate of a clear sound signal without any reverberation is about 93% in the reverberation suppressing apparatus used in the tests. The horizontal axis in the graphs represents the number of repetition times and the vertical axis represents the speech recognition rate (%).

As shown in FIGS. 12 to 15, when the step size is fixed, the convergence speed with the large step size ($\mu$=0.1) of Test Condition 6 is higher than that with the small step size (μ=0.05) of Test Condition 5, but the speech recognition rate after the convergence with the large step size (μ=0.1) of Test Condition 6 is worse than that with the small step size (μ=0.05) of Test Condition 5. That is, in the technology with a fixed step size, it was seen that the separation performance (speech recognition rate) and the convergence speed could not be made consistent with each other. On the other hand, when the step size in Test Condition 4 is calculated in the annealing base, the separation performance and the convergence speed were better in all the tests than those under Test Conditions 5 and 6 with a fixed step size.

In the method according to this embodiment, the number of segments P=2 of Test Condition 1 and the number of segments P=1 of Test Condition 2 were better than those in the other test conditions 4 to 6 in almost all the situations. In addition, the result of the number of segments P=0 meant the performance with one adaptive step size, that is, the test result when the segmented linear model is not applied. Accordingly, the convergence speed in Test Condition 1 with the number of segments P=2 or Test Condition 2 with the number of segments P=1 is higher than that in Test Condition 3 with the number of segments P=0 and the speech recognition rate is higher at a smaller number of repetition times of, for example, about 10 (the separation performance is better).

In FIGS. 12 to 15, the dotted lines 501 to 504 indicate the speech recognition rates when the step size is calculated by annealing and the number of repetition is 30. The cross points 512 to 514 in the drawings indicate the number of repetition at which the speech recognition rate is the same speech recognition rate when the test is carried out with Test Condition 1, the step size is calculated by annealing, and the number of repetition is 30. That is, according to this embodiment, the number of repetition is improved to a half or ⅔ in comparison with other test conditions using known technologies.

FIG. 16 is a diagram illustrating the arranged PTR results of Test A and Test B. As shown in FIG. 16, when the barge-in occurred in Environment 2 with the long reverberation sound, the PTR is 1.4 and the PTR in the known technology was 2.0. Accordingly, it can be seen that the calculation efficiency is greatly improved. For example, when the barge-in is generated in Environment 2 with the long reverberation sound and the number of repetition is 16, the real-time coefficient (=processing time/data lasting time) in this embodiment was less than 1.0.

Although it has been described in the first and second embodiments that the reverberation suppressing apparatus 100 and the reverberation suppressing apparatus 100a are mounted on the robot 1 (1a), the reverberation suppressing apparatus 100 and the reverberation suppressing apparatus 100a may be mounted on, for example, a speech recognizing apparatus or an apparatus having the speech recognizing apparatus.

The operations of the units may be embodied by recording a program for embodying the functions of the units shown in FIG. 2 according to the embodiment in a computer-readable recording medium and reading the program recorded in the recording medium into a computer system to execute the program. Here, the "computer system" includes an OS or hardware such as peripherals.

The "computer system" includes a homepage providing environment (or display environment) using a WWW system.

Examples of the "computer-readable recording medium" include memory devices of portable mediums such as a flexible disk, an magneto-optical disk, a ROM (Read Only Memory), and a CD-ROM, a USB (Universal Serial Bus) memory connected via a USB OF (Interface), and a hard disk built in the computer system. The "computer-readable recording medium" may include a medium dynamically keeping a program for a short time, such as a communication line when the program is transmitted via a network such as Internet or a communication circuit such as a phone line and a medium keeping a program for a predetermined time, such as a volatile memory in the computer system serving as a server or a client. The program may embody a part of the above-mentioned functions or may embody the above-mentioned functions in cooperation with a program previously recorded in the computer system.

What is claimed is:

1. A reverberation suppressing apparatus separating a plurality of sound source signals based on input signals output from a plurality of microphones collecting the plurality of sound source signals, comprising:

a sound signal output unit generating sound signals and outputting the generated sound signals;

a sound acquiring unit acquiring the input signals from the microphones;

a first evaluation function calculation unit calculating a separation matrix representing correlations among the generated sound signals, the input signals, and the sound source signals, and calculating a first evaluation function for evaluating a degree of separation of the sound source signals from the input signals;

a reverberation component suppressing unit calculating, based on the first evaluation function, an optimal separation matrix which is the separation matrix when the degree of separation of the sound source signals is greater than a predetermined value, and suppressing a reverberation component by separating the sound source signals other than the generated sound signals from the input signal based on the calculated optimal separation matrix; and a separation matrix updating unit dividing a step-size function for determining a magnitude of updating of the separation matrix into segments, approximating each of the segments to a linear function, calculating step sizes based on the approximated linear functions, and repeatedly updating the separation matrix by using the calculated step sizes so that the degree of separation of the sound source signals exceeds the predetermined value based on the first evaluation function.

2. The reverberation suppressing apparatus according to claim 1, wherein the separation matrix updating unit calculates the step size for each of the segments by using the step sizes at both ends of each of the segments approximated to the linear function, and calculates the step sizes so that a second evaluation function for evaluating the step sizes is minimized.

3. The reverberation suppressing apparatus according to claim 1, wherein the separation matrix updating unit approximates each of the segments to the linear function so that the step sizes at both ends of each of the segments approximated to the linear functions are continuous to that of the next segments.

4. The reverberation suppressing apparatus according to claim 1, further comprising a whitening unit whitening the input signals and the generated sound signals by performing a spherization process and a variance normalizing process, wherein the first evaluation function calculation unit calculates the separation matrix based on the whitened input signals.

5. The reverberation suppressing apparatus according to claim 4, wherein the whitening unit forcibly removes a temporal correlation from the whitened signals and forcibly removes a correlation between the generated sound signals and the input signals in the whitened signals from the signals obtained by forcibly removing the temporal correlation.

6. The reverberation suppressing apparatus according to claim 1, wherein the reverberation component suppressing unit calculates parameters for calculating a number of the segments by spherization, and calculates the number of the segments by using the calculated parameters.

7. The reverberation suppressing apparatus according to claim 1, wherein the reverberation component suppressing unit suppresses a reverberation component by updating the separation matrix and separating the sound source signals from the input signals by using an independent component analysis method.

8. A reverberation suppressing method in a reverberation suppressing apparatus separating a plurality of sound source signals based on input signals output from a plurality of microphones collecting the plurality of sound source signals, comprising:

a sound signal output step in which a sound signal output unit generates sound signals and outputs the generated sound signals;

a sound acquiring step in which a sound acquiring unit acquires the input signals from the microphones;

a first evaluation function calculation step in which a first evaluation function calculation unit calculates a separation matrix representing correlations among the generated sound signals, the input signals, and the sound source signals, and calculates a first evaluation function for evaluating a degree of separation of the sound source signals from the input signals; and a reverberation component suppressing step in which a second processing unit calculates, based on the first evaluation function, an optimal separation matrix which is the separation matrix when the degree of separation of the sound source signals is greater than a predetermined value, and suppresses a reverberation component by separating the sound source signals other than the generated sound signals from the input signal based on the calculated optimal separation matrix; and a separation matrix updating step in which a separation matrix updating unit divides a step-size function for determining a magnitude of updating of the separation matrix into segments, approximates each of the segments to a linear function, calculates a step sizes based on the approximated linear functions, and repeatedly updates the separation matrix by using the calculated step sizes so that the degree of separation of the sound source signals exceeds the predetermined value based on the first evaluation function.

* * * * *